Patented Aug. 31, 1943

2,328,432

UNITED STATES PATENT OFFICE 2,328,432

WASHING MACHINE

George W. Dunham, Westport, Conn., assignor to General Electric Company, a corporation of New York Application September 19, 1940, Serial No. 357,425

9 Claims.  (Cl. 68—23)

The present invention relates to washing machines of the type in which clothes are washed and centrifugally dried in a single tub or receptacle.

The object of my invention is to provide an improved construction and arrangement for controlling the supply and distribution of water in a machine of this type.

For a consideration of what I believe novel and my invention, attention is directed to the following description and the claims appended thereto.

In the accompanying drawing, Fig. 1 is a sectional top plan view of a machine embodying my invention; Fig. 2 is a sectional elevation of the machine; Fig. 3 is an enlarged sectional view of the circulating pump and the connections thereto; Fig. 4 is a sectional view taken on line 4—4 of Fig. 3; Fig. 5 is a perspective view of the cam controlling the connection to the pump inlet; and Fig. 6 is a fragmentary view of the lever for controlling the discharge from the pump.

Referring to the drawing, there is shown a washing machine having an outer casing or tank 1 in the upper part of which is a tub or clothes receptacle 2 having a bladed agitator 3 therein. Near the top of the receptacle side walls are openings 4 which define the liquid level in the receptacle during washing and which serve as centrifugal discharge openings when the receptacle is rotated at its extracting speed to centrifugally dry the clothes. By suitable mechanism, for example that shown in my Patent 2,161,618, the agitator 3 is oscillated for washing and the receptacle is rotated for extracting by a vertical shaft 5 extending up from the bottom of the outer casing 1 through a sleeve 6.

Below the bottom wall of the outer casing 1 is a pump 7 having its inlet 8 connected to a drain opening 9 and having its discharge 10 connected to a hollow casting 11 fixed to the bottom wall of the outer casing. Fixed in the casting 11 is a tubular post 12 which projects upwardly through the bottom wall of the outer casing and through a rubber bushing 13a in the bottom wall 13 of an annular trough 14 fixed to the side walls of the outer casing above the liquid level therein. Rotatably mounted in the tubular post 12 is a discharge tube 15 having a nozzle 16 at its upper end and having ports 17 in its lower end. The lower end of the discharge tube 15 is fixed to the enlarged head 18 of a rod 19 which extends out through a stuffing box 20 in the bottom of the casting 11. Fixed to the projecting end of the rod 19 is an arm 21 having a pin and slot connection 22 to one end of a bell crank lever 23.

The bell crank lever 23 is pivoted at 23a on a bracket 23b fixed to the outer casing. The other end 24 of the bell crank lever terminates in a handle 25 projecting through a slot 26 in the side wall of the outer casing. By moving the handle 25 along the slot 26 to the full-line, dotted-line, and broken-line positions indicated in Fig. 6, the discharge tube 15 is turned to corresponding positions indicated in Fig. 1. In the full-line or "wash" position, the discharge from the nozzle 16 is directed within the rim 27 of the clothes receptacle 2 onto an annular filter 28 fixed to the inner surface of the receptacle side walls between the openings 4 and the rim 27. At the inner edge of the filter is fixed a ring 29 which, together with the upper part of the receptacle side walls, provides a trough for receiving the liquid discharged from the nozzle 16. The nozzle is placed in the full-line position during washing so that the washing liquid overflowing through the openings 4 into the outer casing will be pumped or circulated onto the filter and returned to the receptacle. During centrifugal drying, when the receptacle is being rotated, the nozzle is placed in the dotted-line or "dry" position in which it discharges to the space between the receptacle and the outer casing. When the tub is to be drained, the nozzle is placed in the broken-line or "drain" position in which it registers with a conduit 30 leading to a drain. A rubber bushing 31 mounted in the side wall of the outer casing around the open end of the conduit 30 provides a seal for the joint between the nozzle 16 and the conduit 30.

In the bottom wall 13 of the trough 14, and directly above the drain opening 9, is a drain opening 32 to which is fixed the upper end of a depending sleeve 33 having ribs 34 on the outer surface thereof. Surrounding the sleeve 33 and slidable on the ribs 34 is a sleeve 35 having a rubber ring 36 at its lower end of slightly greater diameter than the casing drain opening 9. When the sleeve 35 is in the raised position illustrated in Figs. 2 and 3, all of the liquid caught in the trough 14 flows down through the sleeves 33 and 35 into the bottom of the outer casing. When the sleeve 35 is lowered so that the rubber ring 36 engages the bottom wall of the outer casing, the rubber ring provides a seal around the casing drain opening 9 so that all of the liquid caught in the trough 14 flows through the sleeves 33 and 35 and the drain opening 9 to the pump inlet 8. In this position the upper end of the sleeve 35 serves to define the liquid level in the outer casing, since any liquid above the upper end of the sleeve 35 will flow to the pump inlet through the spaces between the sleeve 35 and the ribs 34.

The sleeve 35 is moved between its raised and lowered positions by a rod 37 slidably carried in upper and lower brackets 38 fixed to the side walls of the outer casing and in a sleeve 39 fixed to the bottom wall 13 of the trough 14. The lower end of the rod 37 is fixed to a fork 40 connected to the sleeve 35 by pins 41. The rod 37 is biased to the lowered position by a compression spring 42 arranged between the upper bracket 38 and a cam member 43 fixed to the rod. The cam member 43 cooperates with a cam 44 fixed to the discharge tube 14. The cam 44 has a raised portion 45 which lifts the rod 37 to the position illustrated in Fig. 2 when the nozzle 16 is in the position discharging into the receptacle 2 and has a lowered portion 46 which permits movement of the rod 37 by the spring 42 to its lowered position in which the rubber ring 36 is moved into engagement with the bottom wall of the outer casing when the discharge nozzle 16 is moved into register with the drain conduit 30. In this latter position all of the liquid caught in the trough 14 is pumped to the drain conduit 30. While the discharge nozzle 16 engages the drain conduit 30, the outer casing may be emptied by lifting the rod 37 by means of a ring 47 at its upper end. The rod may be held in the raised position by hooking the ring over a hook 48 on the iner wall of the outer casing.

During the centrifugal drying operation, the clothes may be rinsed by introducing fresh water through a conduit 49 discharging into the receptacle 2. The rinsing water is thrown out through the clothes by centrifugal force. It has been found that if the receptacle 2 is rotated at a high speed during rinsing, the impact of the rinsing water on the clothes may be of sufficient magnitude to tear the fabric. I have found that the speed of rotation during rinsing can be kept to a safe value by discharging water onto the filter 28 or some other part of the rotating receptacle, for example by means of a conduit 50. The water discharged onto the filter 28 through the conduit 50 is thrown outward against the side walls of the outer casing and serves as a water brake to limit the speed of rotation of the receptacle. The conduit 50 may discharge onto the filter since the speed of rotation is such that water falling onto the filter will be centrifugally thrown from its upper surface and will not fall into the rotating receptacle. During the rinsing operation the nozzle 16 is moved into register with the drain conduit 30 so that the water centrifugally discharged from the recetpacle will be caught in the trough 14 and pumped to the drain conduit 30.

In the use of the machine the receptacle 2 is filled with a washing solution until it overflows through the openings 4, the handle 25 is moved to the "wash" position illustrated in Fig. 6, and the clothes to be washed are loaded into the receptacle. The machine is then started in operation so that the agitator 3 is oscillated to wash the clothes, and the pump 7 is rotated to pump the washing solution overflowing through the openings 4 onto the filter through the discharge nozzle 16. At the conclusion of the washing operation the handle 25 is moved to the "dry" position and the receptacle 2 is rotated by the shaft 5 at its centrifugal extracting speed. The liquid in the clothes is centrifugally discharged through the openings 4 against the side walls of the outer casing 1 and falls into the trough 14 whence it flows to the bottom of the outer casing through the sleeves 33 and 35. During this operation the discharge nozzle is in the dotted-line position in which it discharges to the space between the receptacle 2 and the outer casing. Although liquid is being continually circulated by the pump 7, the discharge nozzle 16 is so directed that it does not interfere with the centrifugal drying operation. When the clothes are dried, the handle 25 is moved to the drain position, moving the discharge nozzle into register with the drain conduit 30 and bringing the lowered portion 46 of the cam 44 beneath the cam member 43 so that the rod 37 is moved downward by the spring 42, moving the sleeve 35 downward and bringing the rubber ring 36 into engagement with the bottom of the outer casing. This seals the space around the drain opening 9, and, since the upper end of the sleeve 35 extends above the liquid level in the bottom of the outer casing, the washing solution is stored in the bottom of the outer casing. The clothes may now be rinsed by spraying fresh water into the receptacle through the conduit 49. At the same time, water is discharged onto the filter 28 through the conduit 50. The water sprayed into the receptacle through the conduit 49 is thrown by centrifugal force through the clothes and is discharged through the openings 4 and caught in the trough 14. The water discharged through the conduit 50 is likewise thrown by centrifugal force against the side walls of the outer casing and serves as a water brake to hold the speed of rotation of the receptacle to a safe value, preventing injury of the fabric by impact of the rinse water. The water discharged through the conduit 50 is likewise caught in the trough 14. All of the water caught in the trough 14 flows to the pump inlet through the sleeves 33 and 35 and is pumped through the discharge nozzle 16 to the drain conduit 30. After the clothes are rinsed, the flow through the conduits 49 and 50 may be shut off and the clothes dried by further rotation of the receptacle. If a succeeding batch of clothes is to be washed, the handle 25 is returned to the "wash" position so that the washing solution in the bottom of the outer casing will be pumped to the receptacle. When the washing is completed, the washing solution in the bottom of the outer casing may be pumped to the drain by moving the handle 25 to the "drain" position and by lifting the rod 37 by the ring 47 and hooking the ring over the hook 48. This raises the rubber ring 36 and connects the pump to the bottom of the outer casing.

From one aspect, the nozzle 16 can be considered as a means for diverting the stream discharged from the nozzle within the casing into the drain, into the receptacle, or into the space between the drain and the receptacle.

What I claim as new and desire to secure by Letters Patent of the United States, is:

1. In a washing machine, a casing, a clothes receptacle in the casing, a conduit leading to a drain having an open end presented to the interior of the casing, a pump having its inlet connected to the casing and having a discharge nozzle, and means mounting the nozzle for movement through a series of positions during which the nozzle at all times discharges within the casing, the nozzle in one of said positions discharging into the receptacle and in another of said positions discharging into the open end of the drain conduit.

2. In a washing machine, a casing, a drain conduit having an open end presented to the interior of the casing, a pump having its inlet connected to the casing and having a discharge nozzle, and means mounting the nozzle for movement through a series of positions during which the nozzle at all times discharges within the casing, the nozzle in one of said positions discharging into the open end of the drain conduit.

3. In a washing machine, a casing, a clothes receptacle in the casing in which the clothes are washed, means for rotating said receptacle at a high speed to centrifugally dry the clothes, a pump having its inlet connected to the casing and having a discharge nozzle, means mounting the nozzle for movement through a series of positions during which the nozzle at all times discharges within the casing, the nozzle in one of said positions discharging into said clothes receptacle and in another of said positions discharging to the space between the clothes receptacle and the casing, and control means movable to washing and drying positions, said control means having provisions for moving said nozzle so as to discharge into the clothes receptacle in the washing position and so as to discharge to the space between the clothes receptacle and the casing in the drying position.

4. In a washing machine, a casing, a clothes receptacle therein, means for rotating said receptacle at a high speed to centrifugally dry the clothes, a trough in the casing for receiving the liquid centrifugally discharged from the receptacle, a drain conduit having an open end presented to the interior of said casing, a pump having its inlet connected to the casing and having a discharge conduit within the casing shiftable between positions discharging into said receptacle, to the space between the receptacle and the casing and into the open end of said drain conduit, a connection from the trough selectively discharging to the casing and to the pump inlet, means for shifting said discharge conduit, and means operated by shifting of said discharge conduit for controlling the connection from said trough.

5. In a washing machine, a clothes receptacle, means for rotating said receptacle at a high speed to centrifugally dry the clothes, provisions for introducing rinsing liquid into the receptacle during centrifugal drying, and water brake means including provisions for discharging liquid onto a part rotated with the receptacle for holding the speed to a lower value during rinsing.

6. In a washing machine, a casing, a clothes receptacle therein in which clothes are washed, means for rotating said receptacle at a high speed to centrifugally dry the clothes, a filter on and draining to the receptacle, means for circulating liquid from the receptacle onto the filter during washing, provisions for introducing rinsing liquid into the receptacle during centrifugal drying, and means for discharging liquid onto the filter during centrifugal drying to serve as a water brake to limit the speed of rotation of the receptacle.

7. In a washing machine, a clothes receptacle, means for rotating said receptacle at a high speed to centrifugally dry the clothes, a casing, a trough on the casing for receiving liquid centrifugally discharged from the receptacle, an outlet from the casing, a drain from the trough including a tube movable into and out of sealing engagement with the casing outlet whereby liquid is conducted from said tube respectively to said outlet and to said casing, a drain conduit having an open end presented to the interior of said casing, a pump connected to said casing outlet having a discharge nozzle shiftable through a series of positions during which the nozzle at all times discharges within the casing, the nozzle in one of said positions discharging into the receptacle and in another of said positions discharging into the open end of the drain conduit, and interlocking control means for shifting said pump discharge nozzle to the drain position and for moving said tube into sealing engagement with said casing outlet.

8. In a washing machine, a casing, a clothes receptacle in the casing in which clothes are washed, means for rotating the receptacle at a high speed to centrifugally dry the clothes, a drain conduit having an open end presented to the interior of the casing, a pump having its inlet connected to the casing and having an outlet within the casing and continuously discharging a stream therein, and means for diverting said stream selectively into the receptacle, into the space between the receptacle and the casing, and into the open end of the drain conduit.

9. In a washing machine, a casing, a clothes receptacle in the casing in which the clothes are washed, means for rotating said receptacle at a high speed to centrifugally dry the clothes, a pump having its inlet connected to the casing and having a discharge nozzle for discharging a stream within the casing, control means movable to washing and drying positions, and means for alternatively supporting the nozzle for discharge into the receptacle during washing and into the space between the receptacle and casing during centrifugal drying.

GEORGE W. DUNHAM.